United States Patent
Magnusson et al.

(10) Patent No.: US 7,310,499 B2
(45) Date of Patent: Dec. 18, 2007

(54) METHOD, APPARATUS AND SYSTEM FOR HANDLING UNRELIABLE FEEDBACK INFORMATION IN A WIRELESS NETWORK

(75) Inventors: Per Olof Magnus Magnusson, Linköping (SE); Niclas Wiberg, Linköping (SE); Eva Englund, Linköping (SE); Magnus Lundevall, Solna (SE)

(73) Assignee: Telefonktiebolaget LM Ericsson (publ), Stockholm (SE)

( * ) Notice: Subject to any disclaimer, the term of this patent is extended or adjusted under 35 U.S.C. 154(b) by 454 days.

(21) Appl. No.: 10/780,206

(22) Filed: Feb. 17, 2004

(65) Prior Publication Data

US 2005/0181811 A1   Aug. 18, 2005

(51) Int. Cl.
*H04B 1/00* (2006.01)
*H04B 7/00* (2006.01)

(52) U.S. Cl. .................. 455/69; 455/24; 455/522; 714/748; 714/750

(58) Field of Classification Search .............. 455/24, 455/63.1, 67.11, 68, 69, 522; 370/278, 282; 375/358; 714/748–750, 752, 758
See application file for complete search history.

(56) References Cited

U.S. PATENT DOCUMENTS 5,115,514 A * 5/1992 Leslie ...................... 455/9
2002/0115464 A1 * 8/2002 Hwang et al. ............. 455/522
2003/0103470 A1 * 6/2003 Yafuso ...................... 370/282
2003/0161285 A1 * 8/2003 Tiedemann et al. ........ 370/335
2003/0210668 A1 * 11/2003 Malladi et al. ............. 370/335
2004/0110473 A1   6/2004 Rudolf

FOREIGN PATENT DOCUMENTS

WO   WO-03096298 A1   11/2003
WO   WO-2004002049 A1   12/2003

* cited by examiner

*Primary Examiner*—Nay Maung
*Assistant Examiner*—Tuan H Nguyen
(74) *Attorney, Agent, or Firm*—Michael Cameron

(57) ABSTRACT

The present invention provides a method, apparatus and system for handling unreliable feedback information in a wireless network. The present invention adjusts one or more communications (202) with a receiving unit (272) in a wireless communication network by receiving feedback information (302) relating to the receiving unit (102), determining a feedback information offset for the receiving unit (272), and adjusting the one or more communications (202) with the receiving unit (272) based on the feedback information and the feedback information offset (306).

7 Claims, 11 Drawing Sheets

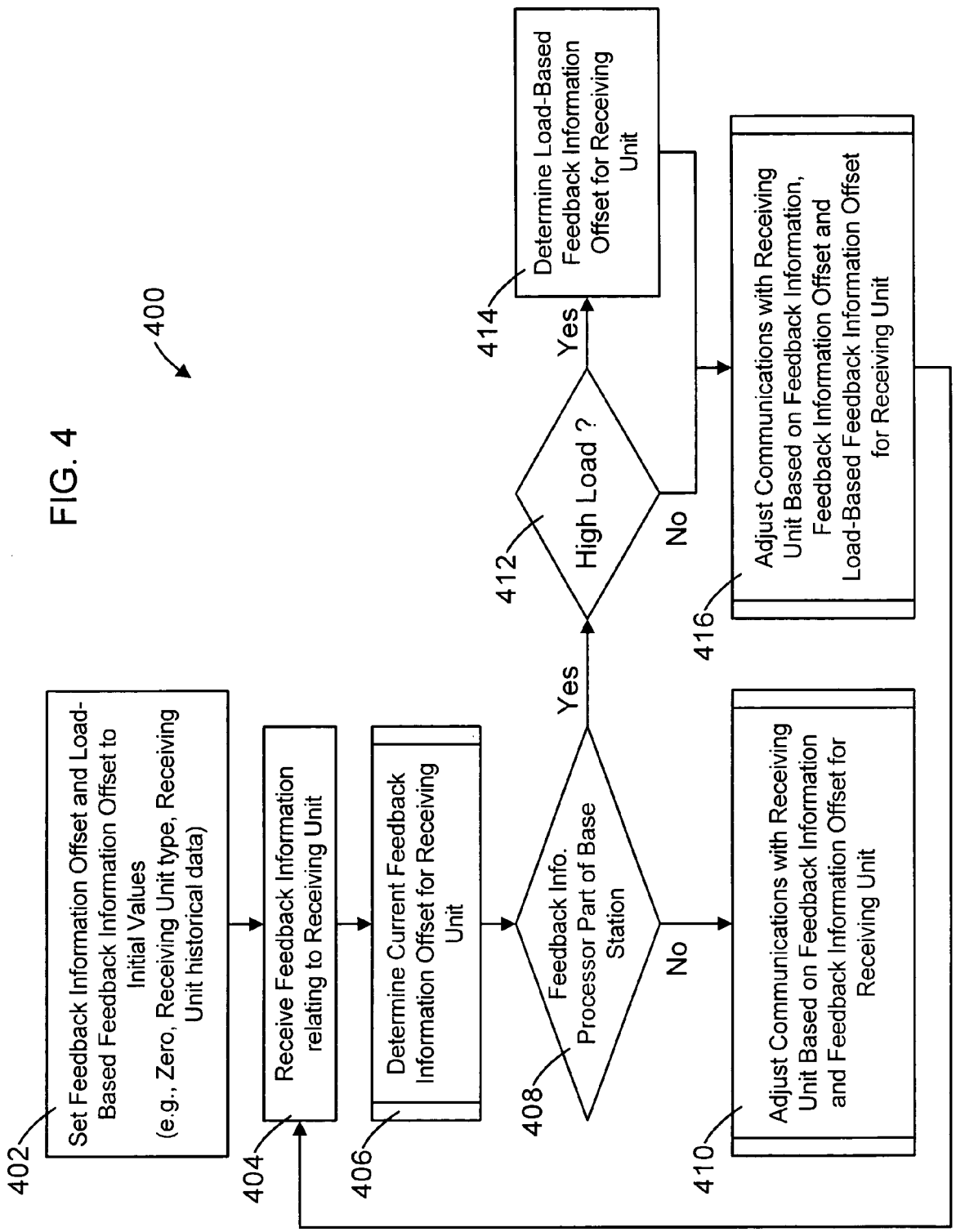

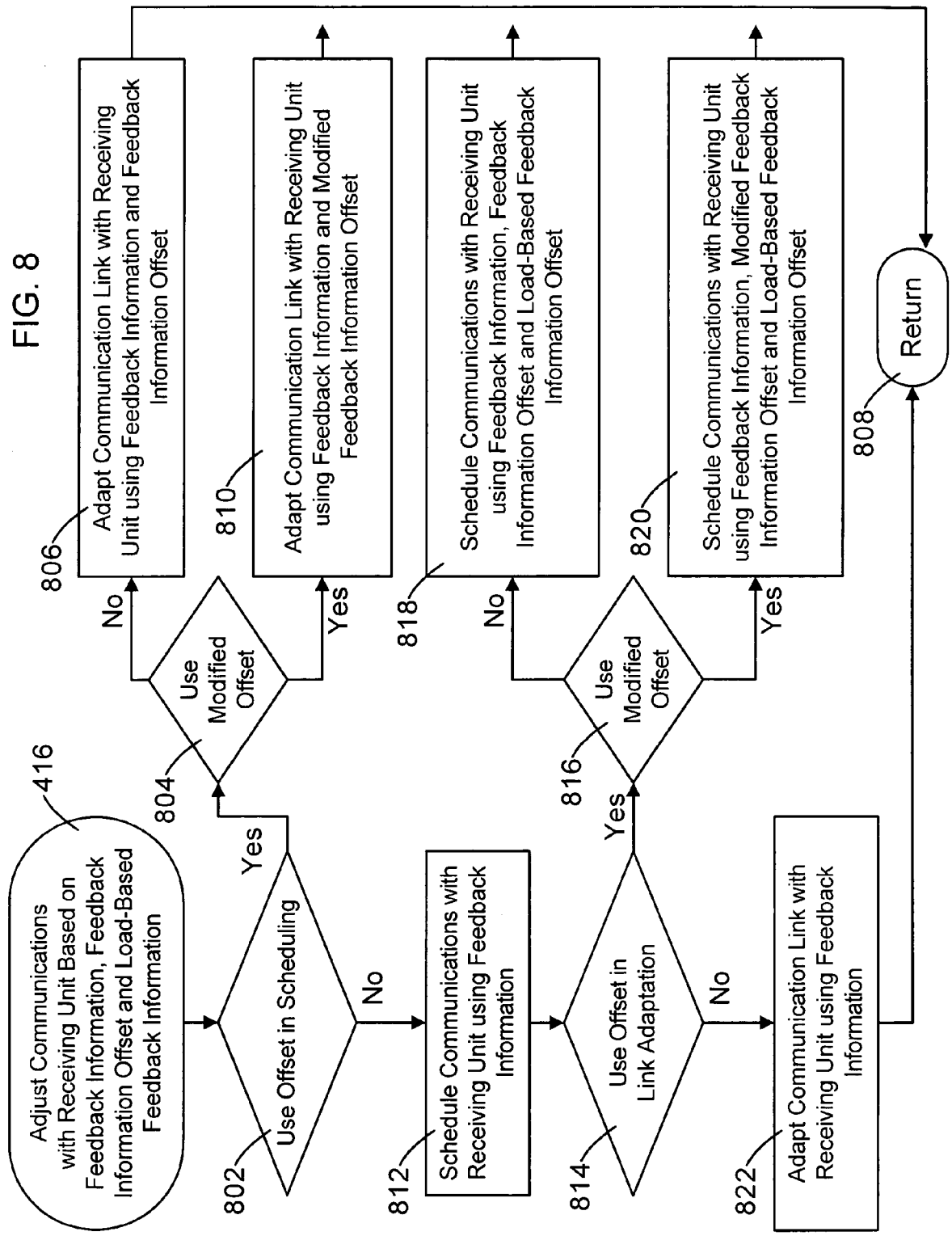

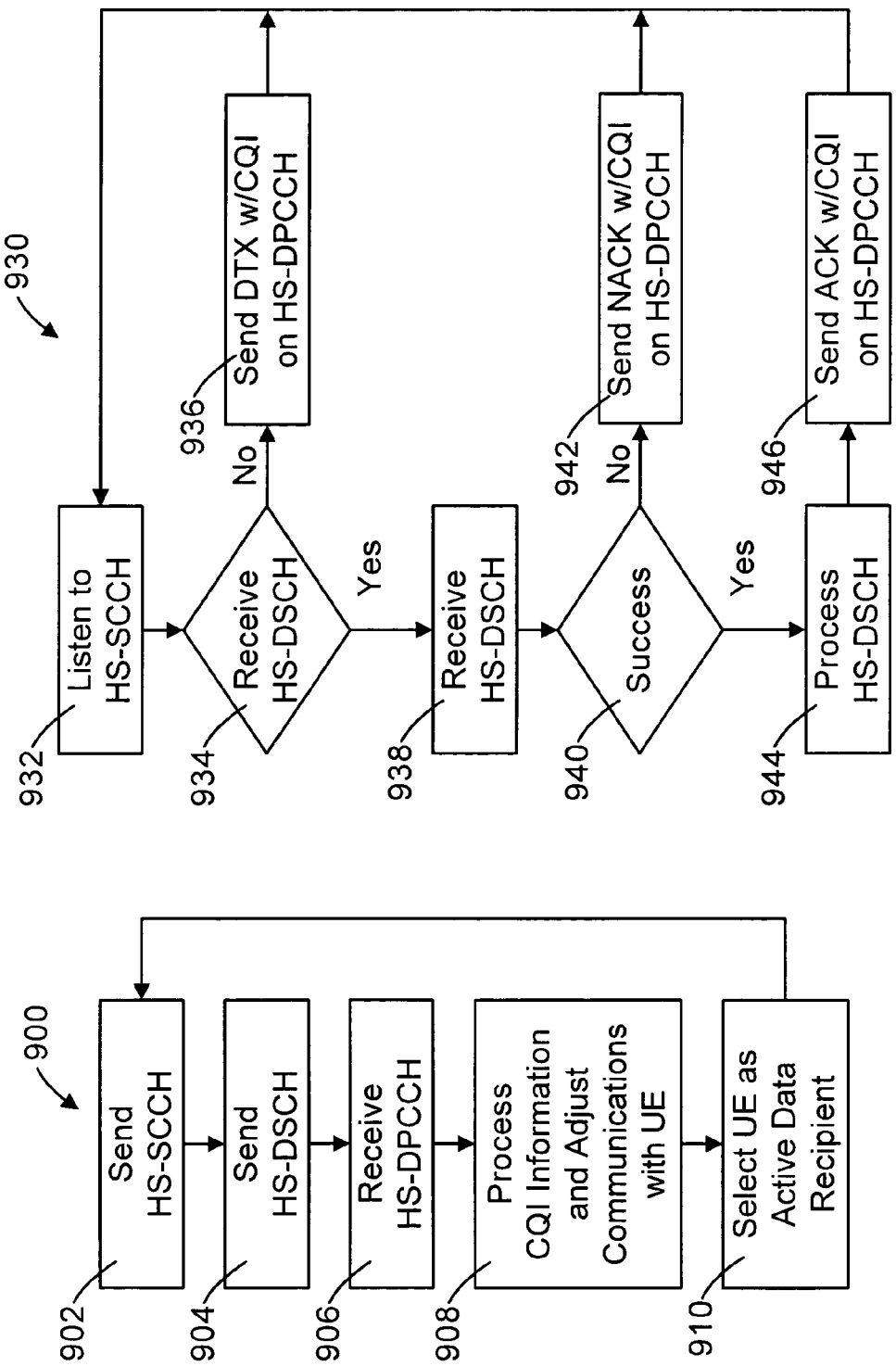

METHOD, APPARATUS AND SYSTEM FOR HANDLING UNRELIABLE FEEDBACK INFORMATION IN A WIRELESS NETWORK

FIELD OF THE INVENTION

The present invention relates generally to the field of communications and, more particularly, to a method, apparatus and system for handling unreliable feedback information in a wireless network.

BACKGROUND OF THE INVENTION

Wireless communication networks facilitate communications with mobile or wireless user equipment ("UE") (often referred to as mobile subscribers, remote stations or terminals). UE may include cordless phones, cellular phones, satellite phones, pagers, computers, personal data assistants ("PDAs"), entertainment devices, combined function devices, etc. The network equipment and UE have been modified to use feedback information provided by the UE to adjust future communications with the UE in order to improve quality and throughput. One type of feedback information that is often used is referred to as channel quality information ("CQI") and may include information regarding the quality of the transmission channel. The UE measures the channel quality and provides feedback information to the network equipment. The network equipment uses the feedback information for many purposes, such as: selecting which UE to transmit data to (channel-dependent scheduling), selecting transport format for that UE (link adaptation) and power-setting (also some kind of link adaptation).

Unfortunately, the feedback information actually reported by the UEs cause its own problems. Specifically, the UEs cannot be trusted to report accurate feedback information. In fact, some current feedback information (e.g., CQI measurements) standards, such as WCDMA (a code division multiple access ("CDMA") standard issued by the 3d Generation Partnership Project ("3GPP")), allow vendors to produce UE's that report inaccurate CQI estimates. These unreliable CQI reports are harmful to network performance in several ways. For example, unreliable feedback information may cause a significant reduction in network capacity. In addition, unreliable CQI estimates can cause serious problems when channel-dependent scheduling is used. With channel dependent scheduling, the scheduler typically favors UE with a high reported CQI (i.e., a UE that reports a high CQI is more likely to be scheduled). If the CQI reports are unreliable, a channel-dependent scheduler will typically select the UE that overestimate their channel condition. This means that even if the reported CQI's are not initially biased, the CQI seen "after scheduling" will be predominately overestimated.

Moreover, UE that reports a larger CQI than what is motivated by the actual radio conditions may not necessarily suffer from low throughput since retransmissions are typically prioritized in the scheduling and the higher BLER may very well be compensated by being scheduled for transmission more often. While this may be beneficial for the user owning that UE, it results in worse performance for other users and worse overall performance (lower system throughput), both due to inefficient link adaptation and due to inefficient scheduling. As a result, especially from the network perspective, it is important to protect the network from UEs that report erroneous CQI. In particular, it is important to protect the scheduler from favoring UEs with too high reported CQI. Accordingly, there is a need for a method, apparatus and system for handling unreliable feedback information in a wireless network.

SUMMARY OF THE INVENTION

The present invention provides a method, apparatus and system for handling unreliable feedback information in a wireless network. The present invention solves the problems caused by receiving units that report unreliable radio conditions, CQI, i.e., reports that do not reflect the actual radio conditions. A feedback information offset is determined for the receiving unit and used in connection with the feedback information received from the receiving unit to adjust communications with the receiving unit. The communications are typically adjusted via scheduling and/or link adaptation. The feedback information offset is thereafter adjusted to cause the combination of the feedback information offset and feedback information to more accurately reflect current radio conditions. Communications are, therefore, scheduled and adjusted more efficiently, which results in improved system throughput. The receiving unit can be a user equipment, a base station or any other device that communicates with multiple user equipment. Likewise, although the following description focuses the use of the invention to modify or adapt the downlink based on feedback information, the present invention can be used to modify or adapt the uplink based on feedback information (e.g., a CDMA2000 reverse link).

More specifically, the present invention provides a method of adjusting one or more communications with a user equipment in a wireless communication network by receiving feedback information relating to the user equipment, determining a feedback information offset for the user equipment, and adjusting the one or more communications with the user equipment based on the feedback information and the feedback information offset. The feedback information may include an acknowledgement ("ACK"), a negative acknowledgement ("NACK"), a channel quality indication ("CQI") or a discontinuous transmission ("DTX") bit. Other communication metrics may also be used, such as a block error rate ("BLER"), or an actual number and/or average number of transmissions. The feedback information offset may include an initial value of zero, a value based on the user equipment, a value based on a user profile associated with the user equipment, a value based on historical data, a value derived from other feedback information (e.g., an ACK/NACK received from the user equipment), a value based on one or more conditions of the wireless communication network or a load-based offset. The feedback information offset may include separate offset for scheduling and link adaptation. This method can be implemented by a computer program embodied on a computer readable medium wherein the various process steps are executed by one or more code segments.

The present invention also provides an apparatus for adjusting one or more communications with a user equipment in a wireless communication network. The apparatus includes a processor that accesses feedback information related to the user equipment, determines a feedback information offset for the user equipment and provides one or more instructions to adjust the one or more communications with the user equipment based on the feedback information and the feedback information offset.

In addition, the present invention provides another apparatus that includes a receiver, a feedback information processor communicably coupled to the receiver and a transmitter communicably coupled to the feedback information processor. The receiver receives feedback information relating to the user equipment. The feedback information processor determines a feedback information offset for the user equipment and adjusts the one or more communications with the user equipment based on the feedback information and the feedback information offset. The transmitter transmits the one or more communications to the user equipment.

Moreover, the present invention provides a system for adjusting one or more communications in a wireless communication network. The system includes one or more user equipments and one or more base stations communicably coupled to the user equipment. Each user equipment includes a receiver, a feedback information estimator communicably coupled to the receiver and a transmitter communicably coupled to the feedback information estimator. Each base station includes a receiver, a feedback information processor communicably coupled to the receiver and a transmitter communicably coupled to the feedback information processor. The base station receiver receives feedback information relating to the user equipment. The feedback information processor determines a feedback information offset for the receiving unit and adjusts the one or more communications with the user equipment based on the feedback information and the feedback information offset. The base station transmitter transmits the one or more communications to the user equipment.

BRIEF DESCRIPTION OF THE DRAWINGS

The above and further advantages of the invention may be better understood by referring to the following description in conjunction with the accompanying drawings, in which:

FIG. 4 is a flow chart illustrating a method of adjusting communications in accordance with another embodiment of the present invention;

FIG. 8 is a flow chart illustrating a method to adjust communications based on feedback information and a feedback information offset in accordance with another embodiment of the present invention;

FIG. 9A is a flow chart illustrating a method to adjust communications at a base station in a CDMA network in accordance with one embodiment of the present invention;

FIG. 9B is a flow chart illustrating a method of reporting feedback information at the user equipment in accordance with one embodiment of the present invention.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates to communication systems, and more particularly, to a code division multiple access ("CDMA") communication system, such as CDMA2000 (a CDMA standard issued by the Telecommunication Industry Association ("TIA")) or WCDMA (a CDMA standard issued by the 3d Generation Partnership Project ("3GPP")). It will be understood that, although the description herein refers to a communication environment, the concepts of the present invention are applicable to any packet-based wireless environment or any communication system that uses feedback information, to improve system performance, including, but not limited to, frequency division multiple access ("FDMA"), time division multiple access ("TDMA"), a circuit switched Global System for Mobile Communications ("GSM system") with adaptive multi-rate ("AMR") speech, etc.

The present invention provides a method, apparatus and system for handling unreliable feedback information in a wireless network. The present invention solves the problems caused by user equipment ("UE") (often referred to as mobile subscribers, remote stations or terminals) that report unreliable radio conditions, i.e., reports that do not reflect the actual radio conditions. A feedback information offset is determined for the UE and used in connection with the feedback information received from the UE to adjust communications with the UE. The communications are typically adjusted via scheduling and/or link adaptation. The feedback information offset is thereafter adjusted to cause the combination of the feedback information offset and feedback information to more accurately reflect current radio conditions. Communications are, therefore, scheduled and adjusted more efficiently, which results in improved system throughput. Note that although the following description of the invention uses the terms UE and base station, the UE can be any type of receiving equipment and the base station can be any type of transmitting equipment. Likewise, although the following description focuses the use of the invention to modify or adapt the downlink based on feedback information, the present invention can be used to modify or adapt the uplink based on feedback information (e.g., a CDMA2000 reverse link).

Figure 1:
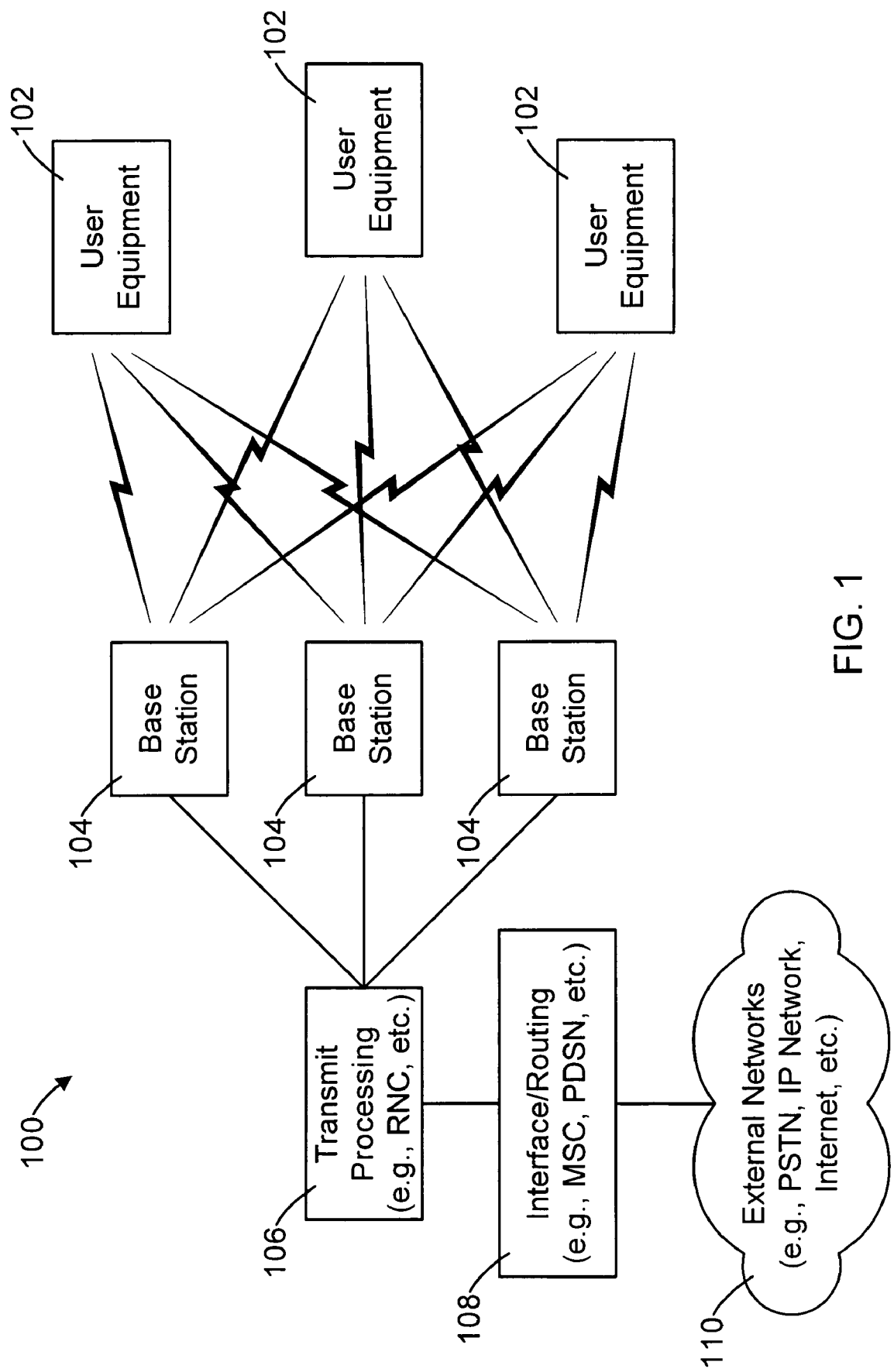
FIG. 1 is a block diagram of a wireless network in accordance with one embodiment of the present invention.

Now referring to FIG. 1, a block diagram of a wireless communication network 100 in accordance with one embodiment of the present invention is shown. The system 100 includes one or more UEs 102, one or more base stations 104, a transmit processing node 106 (e.g., radio network controller ("RNC"), etc.), an interface/routing node 108 (e.g., mobile switching center ("MSC"), public data serving node ("PDSN"), etc.), and one or more external networks 110 (e.g., public switched telephone network ("PSTN"), Internet Protocol ("IP") network, Internet, etc.). The one or more UEs 102 may include cordless phones, cellular phones, satellite phones, pagers, computers, personal data assistants ("PDAs"), entertainment devices, combined function devices, or any other type of wireless communications device. The one or more UEs 102 are communicably coupled to the one or more base stations 104 via various wireless communication links or channels depending on the communication standard being used (e.g., CDMA2000, WCDMA, etc.). The base stations 104 are also commonly referred to as base station transceivers ("BTS") or Node Bs. Although FIG. 1 depicts three UEs 102, three base stations 104, one transmit processing node 106, one interface/routing node 108 and one external network 110, those skilled in the art will understand that the number and configuration of the UEs 102, base stations 104, transmit processing node 106, interface/routing node 108 and external network 110 can be changed to fit the particular situation.

The base stations 104 are typically communicably coupled to the transmit processing node 106, the transmit processing unit 106 is communicably coupled to the interface/routing node 108 and the interface/routing node is communicably coupled to the external networks 110 via wirelines configured for transmission of voice and/or data packets in accordance with any of several known protocols (e.g., E1, T1, Asynchronous Transfer Mode ("ATM"), IP, Point-to-Point Protocol ("PPP"), Frame Relay, HDSL, ADSL, XDSL, etc.). Note that transmit processing node 106 can be integrated into or directly connected to the interface/routing node 108.

During typical operations, the base stations 104 receive communications or signals from the UEs 102 engaged in telephone calls, text or image messaging, Internet browsing, gaming, paging or other data communications. Each communication received by a given base station 104 is processed within that base station 104. Each base station 104 may communicate with a large number of UEs 102. The base stations 104 segment the UE 102 communications into packets that are forwarded to transmit processing node 106, which provides call resource allocation and mobility management functions.

Figure 2A:
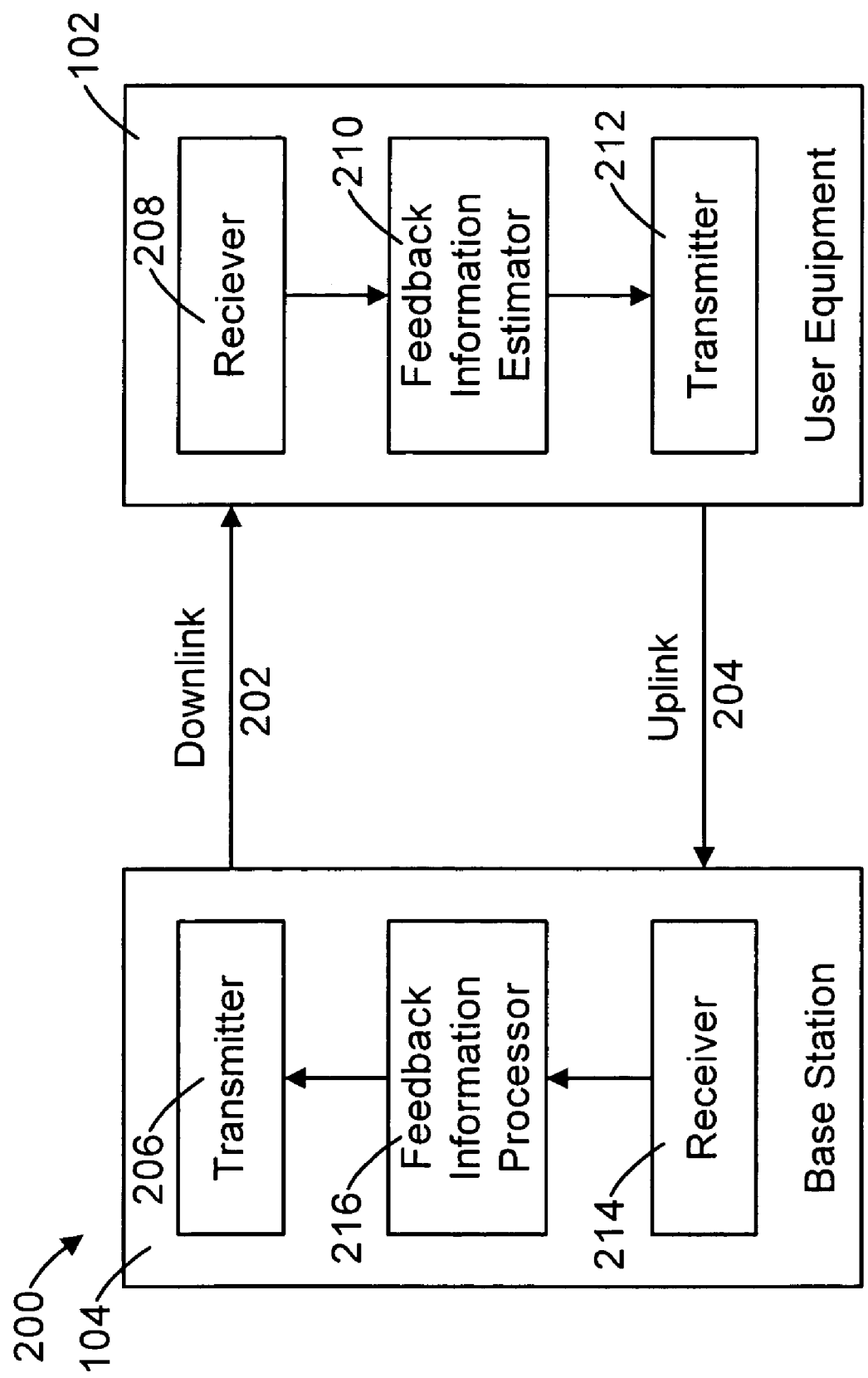
FIG. 2A is a block diagram of a base station and user equipment in accordance with one embodiment of the present invention.

Referring now to FIG. 2A, a block diagram 200 of a base station 104 and UE 102 in accordance with one embodiment of the present invention is shown. The base station 104 transmits on the downlink 202 to the UE 102 and the UE 102 transmits on the uplink 204 to the base station 104. The downlink 202 and uplink 204 are uncorrelated, so one does not facilitate the prediction of the other. The downlink 202 from the base station 104 to a UE 102 can include multiple channels. Similarly, the uplink 204 from the UE 102 to the base station 104 can include multiple channels. Each channel carries different types of information to the target destination. Typically, voice traffic is carried on dedicated channels, while data traffic is preferably carried on shared channels or packet data channels. Shared channels carry signals that are designated for different parties in a time and/or code-multiplexed manner. The specific channels used in the downlink 202 and uplink 204 will be dictated by the specification for the communication system being used.

For example, in third generation ("3G") cellular systems, such as WCDMA, a variety of radio channels exist with different characteristics. A common channel is common to a number of UEs 102, typically all UEs 102 in a cell or a part of the UEs 102 in a cell. When using these types of channels, each block sent on the channel needs to contain some kind of identity of the UE 102. Another characteristic is that the power is controlled in a slow way (for uplink 204 common channels) or is fixed (for downlink 202 common channels). These channels may be used for small data packets and the capacity is limited. Examples of common channels in WCDMA are PRACH (Physical Random access channel—uplink), PCPCH (Physical Common Packet Channel—uplink) and SCCPCH (Secondary Common Control Physical Channel—downlink).

A dedicated channel is assigned exclusively to one UE 102 by the network and may be used by only that UE 102. This channel provides fast power control and soft handover. A dedicated channel is associated with a maximum block size, which is assigned when the channel is established. The UE 102 may then use different sizes of the transmitted blocks (up to the maximum) to accomplish a variable bit-rate channel but the dedicated channel assigned to the UE 102 cannot be used for transmission to other users when there is less data than the maximum rate to transmit to the user that is assigned the dedicated channel. An example of a dedicated channel in WCDMA is the DPCH (Dedicated Physical Channel—used in both uplink 204 and downlink 202).

A shared channel is shared by a set of UEs 102 in a cell. The base station 104 or the transmit processing node 106 (e.g., RNC, etc.) selects which UE 102 is allowed to use the channel at each time instance. The main idea with a shared channel is that the radio resources can be more efficiently used for packet data services. Examples of shared channels are DSCH (Downlink Shared Channel) and HS-DSCH (High-Speed Downlink Shared Channel) in WCDMA and F-PDCH (Forward Packet Data Channel) in CDMA2000. In HS-DSCH and F-PDCH, each UE 102 reports radio conditions, Channel Quality Indication ("CQI"), to the network (base station 104) which is used by the network (base station 104) to select which UE 102 to send data to (scheduling), adapt data rate and channel modulation to current radio conditions (link adaptation), and select amount of power to use for transmission. The channel quality may be measured in terms of a carrier to interference ("C/I") ratio and is based upon received downlink link signals 202. The C/I value is typically mapped onto a five-bit CQI symbol, wherein the fifth bit is reserved, to provide sixteen quantization values (in HS-DSCH, 20 values are available as the fifth bit is not reserved). The UE 102 transmits the C/I values continuously, so that the base station 104 can monitor the channel conditions.

The base station 104 transmitter 206 sends communications or signals to the UE 102 receiver 208 via downlink 202. The received transmissions are de-spread, demodulated and decoded by UE 102. The UE 102 uses a feedback information estimator 210 to calculate or estimate current radio conditions, otherwise referred to as feedback information or CQI. The UE 102 transmitter 212 sends the feedback information to the base station 104 receiver 214 via uplink 204. The base station 104 then processes the feedback information using a feedback information processor 216, which adjusts future communications (scheduling, link adaptation (e.g., transmission formats, data rates, etc.), power levels, etc.) with the UE 102 based on the feedback information and a feedback information offset. The feedback information may include an acknowledgement ("ACK"), a negative acknowledgement ("NACK"), a channel quality indication ("CQI"), a discontinuous transmission ("DTX") bit, a block error rate ("BLER"), an average number of transmissions or other communication metric. The feedback information offset (also referred to as a CQI offset) may include an initial value of zero, a value based on the UE 102 (identify the UE 102 and treat it differently depending on its brand and type), a value based on a user profile associated with the UE 102, a value based on historical data (this accounts for the possibility that UEs 102 may behave differently even if they are of the same type, e.g., due to manufacturing problems, version upgrades, or even modifications by individual users), a value derived from feedback information received from the UE 102, a value based on one or more conditions of the wireless communication network or a load-based offset. The feedback information offset may also include separate offsets for scheduling and link adaptation.

Figure 2B:
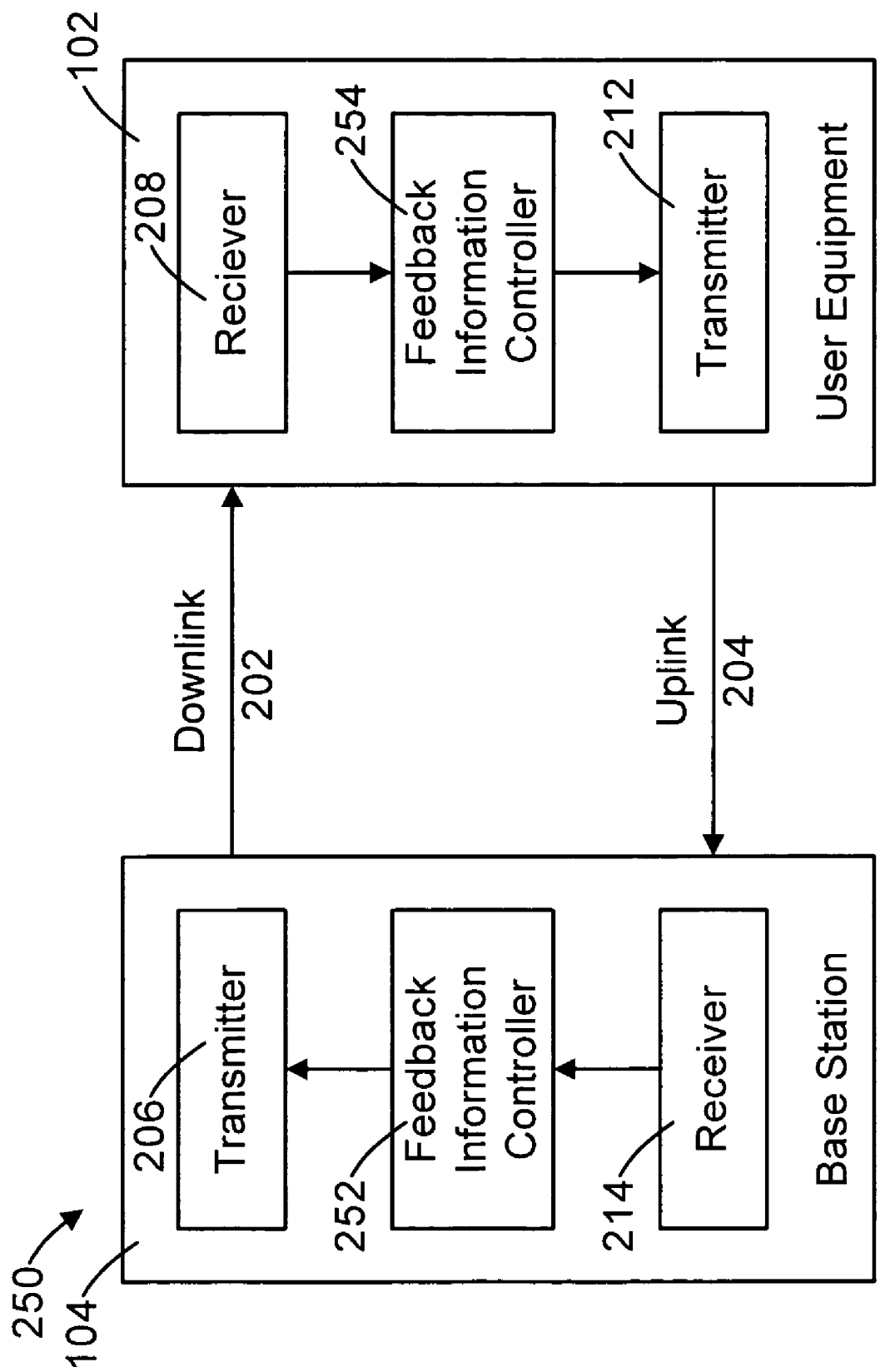
FIG. 2B is a block diagram of a base station and user equipment in accordance with another embodiment of the present invention.

Now referring to FIG. 2B, a block diagram 250 of a base station 104 and user equipment 102 in accordance with another embodiment of the present invention is shown. The base station 104 transmitter 206 sends communications or signals to the UE 102 receiver 208 via downlink 202. The received transmissions are de-spread, demodulated and decoded by UE 102. The UE 102 uses a feedback information controller 254 to perform two functions—feedback information processing (see 216 FIG. 2A) and feedback information estimation (see 210 FIG. 2A). As a result, the UE 102 feedback information controller 254 calculates or estimates current radio conditions, otherwise referred to as feedback information or CQI, and processes feedback information received from the base station 104 to adjust future communications (link adaptation, power levels, etc.) with the base station 104 based on the feedback information supplied by the base station 104 and a feedback information offset for the base station 104. The UE 102 transmitter 212 sends the calculated feedback information for the UE 102 to the base station 104 receiver 214 via uplink 204. The base station 104 then uses a feedback information controller 252 to perform two functions—feedback information processing (see 216 FIG. 2A) and feedback information estimation (see 210 FIG. 2A). The base station 104 feedback information processor 252 calculates or estimates current radio conditions, otherwise referred to as feedback information, and processes the feedback information received from the UE 102 to adjust future communications (scheduling, link adaptation (e.g., transmission formats, data rates, etc.), power levels, etc.) with the UE 102 based on the feedback information supplied by the UE 102 and a feedback information offset for the UE 102. The base station 104 transmitter 206 then sends the feedback information for the base station 104 to the UE 102 receiver 208 via downlink 202.

Figure 2C:
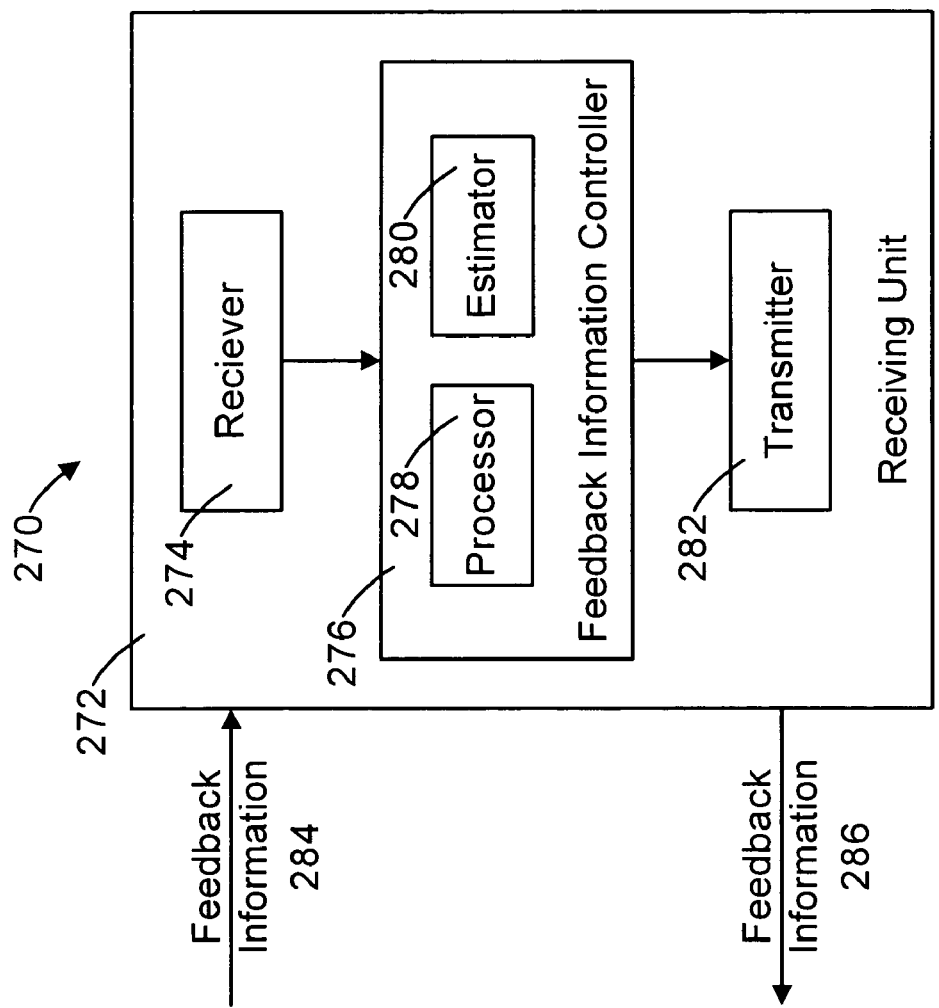
FIG. 2C is a block diagram of a receiving unit in accordance with one embodiment of the present invention.

Referring now to FIG. 2C, a block diagram 270 of a receiving unit 272 in accordance with one embodiment of the present invention is shown. As illustrated in FIG. 2B, the receiving unit 272 can be a base station (104 FIG. 1) or a UE (102 FIG. 1) and uses a feedback information controller 276 to perform two functions—feedback information processing 278 and feedback information estimation 280. The receiving unit 272 receives feedback information 284 via receiver 274. The receiving unit 272 feedback information controller 276 estimator 280 calculates or estimates current radio conditions, otherwise referred to as feedback information or CQI. The receiving unit 272 feedback information controller 276 processor 278 processes feedback information received from the transmitting unit to adjust future communications (scheduling, link adaptation, power levels, etc.) with the transmitting unit based on the feedback information supplied by the transmitting unit and a feedback information offset for the transmitting unit. The receiving unit 272 transmitter 282 sends the calculated feedback information 286 for the receiving unit 272 to the transmitting unit.

As will be illustrated in FIGS. 3-8, the base station 104 or receiving unit 272 dynamically calculates and updates a feedback information offset for each connected UE 102 or receiving unit 272. The feedback information offset is applied to the reported feedback information or CQI before selecting the UE 102 or receiving unit 272 to transmit to (scheduling decision). The same or modified offset can also be applied in the transport format selection (link adaptation). The offset should be negative for UEs 102 or receiving units 272 with too high reported CQI (overestimated). This means that the base station 104 or receiving unit 272 scheduler will be more restrictive towards the UEs 102 or receiving units 272 that report too high CQI estimates and decrease their chances to transmit/receive data. This will lead to higher total cell throughput as UEs 102 or receiving units 272, which do not report overestimated CQI will be favored.

One method for updating the feedback information offset is to decrease it by a specified amount at the first transmission error (received NACK) and to increase it by a specified amount at every correctly received transmission (received ACK). The increase/decrease amount should be set such that the feedback information does not decrease when the BLER is close to the desired value (e.g., 10%), but that it decreases when the BLER is higher. It is important to distinguish between initial transmissions and retransmissions because the desired BLER value (e.g., 10%) is applicable only for the initial transmission. Thus, the feedback information offset will be negative for UEs 102 with too high reported feedback information. In addition, the feedback information offset may be subject to range limitations, i.e. a maximum and minimum value may be specified. A positive feedback information offset may also be applied in both scheduling and link adaptation, this will also improve the link adaptation performance for UEs 102 with biased too low feedback information estimates. An alternative approach is to use the average number of transmissions needed as a measure to estimate the feedback information offset instead of or in addition to ACK/NACK statistics from the initial transmission.

Accordingly, the feedback information offset can be viewed as a "correction" to the reported CQI, i.e. when the offset is applied, the resulting value will be a more accurate estimate of the channel quality. This requires positive as well as negative values, within a reasonable range. As a result, it is useful for both scheduling and link adaptation. Alternatively, the feedback information offset can be viewed as a "punishment factor" in which case it should probably only be negative. The feedback information offset could be positive below the desired BLER value (e.g., 10%) and −|offset| could be used in the scheduling decision (using minus the absolute value). This feedback information offset should not, however, be used for link adaptation. Alternative solutions might be to use separate feedback information offsets for link adaptation and scheduling or only use negative feedback information offsets in link adaptation, but not in scheduling.

As a result, the present invention provides a system for adjusting one or more communications in a wireless communication network. As shown in FIG. 2A, the system includes one or more UEs 102 and one or more base stations 104 communicably coupled to the UEs 102. Each UE 102 includes a receiver 208, a feedback information estimator 210 communicably coupled to the receiver 208 and a transmitter 212 communicably coupled to the feedback information estimator 210. Each base station 104 includes a receiver 214, a feedback information processor 216 communicably coupled to the receiver 214 and a transmitter 206 communicably coupled to the feedback information processor 216. The base station 104 receiver 216 receives feedback information relating to the UE 102. The feedback information processor 216 determines a feedback information offset for the UE 102 and adjusts the one or more communications with the UE 102 based on the feedback information and the feedback information offset. The base station 104 transmitter 206 transmits the one or more communications to the UE 102 via downlink 202. In addition, the present invention provides a processor 216 that accesses feedback information related to the UE 102, determines a feedback information offset for the UE 102 and provides one or more instructions to adjust the one or more communications with the UE 102 based on the feedback information and the feedback information offset. As shown in FIGS. 2B and 2C, the base stations 104 and UEs 102 can be configured to use a feedback information controller 252 and 254 and can be referred to generically as a receiving unit 272.

Figure 3:
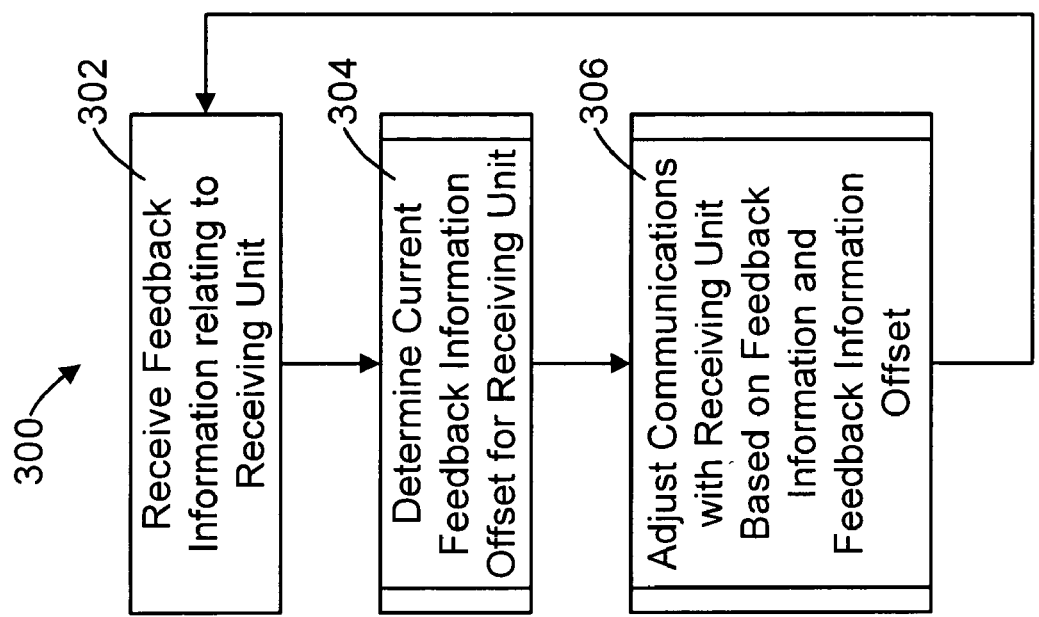
FIG. 3 is a flow chart illustrating a method of adjusting communications in accordance with one embodiment of the present invention.

Now referring to FIG. 3, a flow chart illustrating a method of adjusting communications 300 in accordance with one embodiment of the present invention is shown. More specifically, feedback information relating to the UE 102 or receiving unit 272 is received in block 302 and a feedback information offset is determined for the UE 102 or receiving unit 272 in block 304 (see also FIGS. 5 and 6). Typically, the feedback information offset is a positive value whenever the feedback information for the UE 102 or receiving unit 272 is underestimated and a negative value whenever the feedback information for the UE 102 or receiving unit 272 is overestimated. Thereafter, the one or more communications with the UE 102 or receiving unit 272 are adjusted based on the feedback information and the feedback information offset in block 306 (see also FIG. 7). This process 300 repeats as long as communications continue with the UE 102 or receiving unit 272, or the network equipment determines that the feedback information offset no longer needs to be calculated. The one or more communications with the UE 102 or receiving unit 272 can be adjusted by adapting one or more communication links (e.g., changing a data rate, a channel modulation or a power level for the one or more communication links, etc.) with the UE 102 or receiving unit 272 using the feedback information and the feedback information offset. In addition, the one or more communications with the UE 102 or receiving unit 272 can be adjusted by changing the scheduling of one or more communications with the UE 102 or receiving unit 272 based on the feedback information and the feedback information offset.

As previously stated, the feedback information may include an ACK, a negative acknowledgement NACK, a CQI, a DTX bit, a BLER, an average number of transmissions or other communication metric. The feedback information offset may include an initial value of zero, a value based on the UE 102 (i.e., properties of the UE 102, such as category, model, etc.) or receiving unit 272, a value based on a user profile associated with the UE 102 or receiving unit 272, a value based on historical data, a value derived from feedback information received from the UE 102 or receiving unit 272, a value based on one or more conditions of the wireless communication network or a load-based offset. The feedback information offset may include separate offset for scheduling and link adaptation.

Referring now to FIG. 4, a flow chart illustrating a method of adjusting communications 400 in accordance with another embodiment of the present invention is shown. In the case where the base station 104 is experiencing a high load and is using CQI based scheduling, there may be a scheduling induced CQI bias. It may, therefore, be desirable to have an additional offset that is applied to the CQI of the UE 102 or receiving unit 272 and that may be dependent on number of UEs or receiving units 272 in queue for scheduling and scheduling principal. In such a process 400, a feedback information offset and a load-based feedback information offset are set to initial values in block 402 (e.g., zero, a value based on the UE 102 or receiving unit 272, a value based on a user profile associated with the UE 102 or receiving unit 272, a value based on historical data, a value derived from feedback information received from the UE 102 or receiving unit 272, a value based on one or more conditions of the wireless communication network, etc.). Feedback information relating to the UE 102 or receiving unit 272 is then received in block 404 and a current feedback information offset is determined for the UE 102 or receiving unit 272 in block 406 (see also FIGS. 5 and 6). If the feedback information processor 216 or 278 is not part of a base station 104 or other device communicating with multiple UEs 102 or receiving units 272, as determined in decision block 408, the one or more communications with the UE 102 or receiving unit 272 are adjusted based on the feedback information and the feedback information offset in block 410 (see also FIG. 7). New feedback information is then received in block 404 and repeats as previously described as long as communications continue with the UE 102 or receiving unit 272, or the network equipment determines that the feedback information offset no longer needs to be calculated. If, however, the feedback information processor 216 or 278 is part of a base station 104 or other device communicating with multiple UEs 102 or receiving units 272, as determined in block 408, and the base station 104 or other device communicating with multiple UEs 102 or receiving units 272 is operating under high load conditions, as determined in decision block 412, a load-based feedback information offset is determined for the UE 102 or receiving unit 272 in block 414. Thereafter or if the base station 104 or other device communicating with multiple UEs 102 or receiving units 272 is not operating under high load conditions, as determined in decision block 412, the one or more communications with the UE 102 or receiving unit 272 are adjusted based on the feedback information, the feedback information offset and load-based feedback information offset (may only be non-zero in high load conditions) in block 416 (see also FIG. 8). New feedback information is then received in block 404 and repeats as previously described as long as communications continue with the UE 102 or receiving unit 272, or the network equipment determines that the feedback information offset no longer needs to be calculated.

Figure 5:
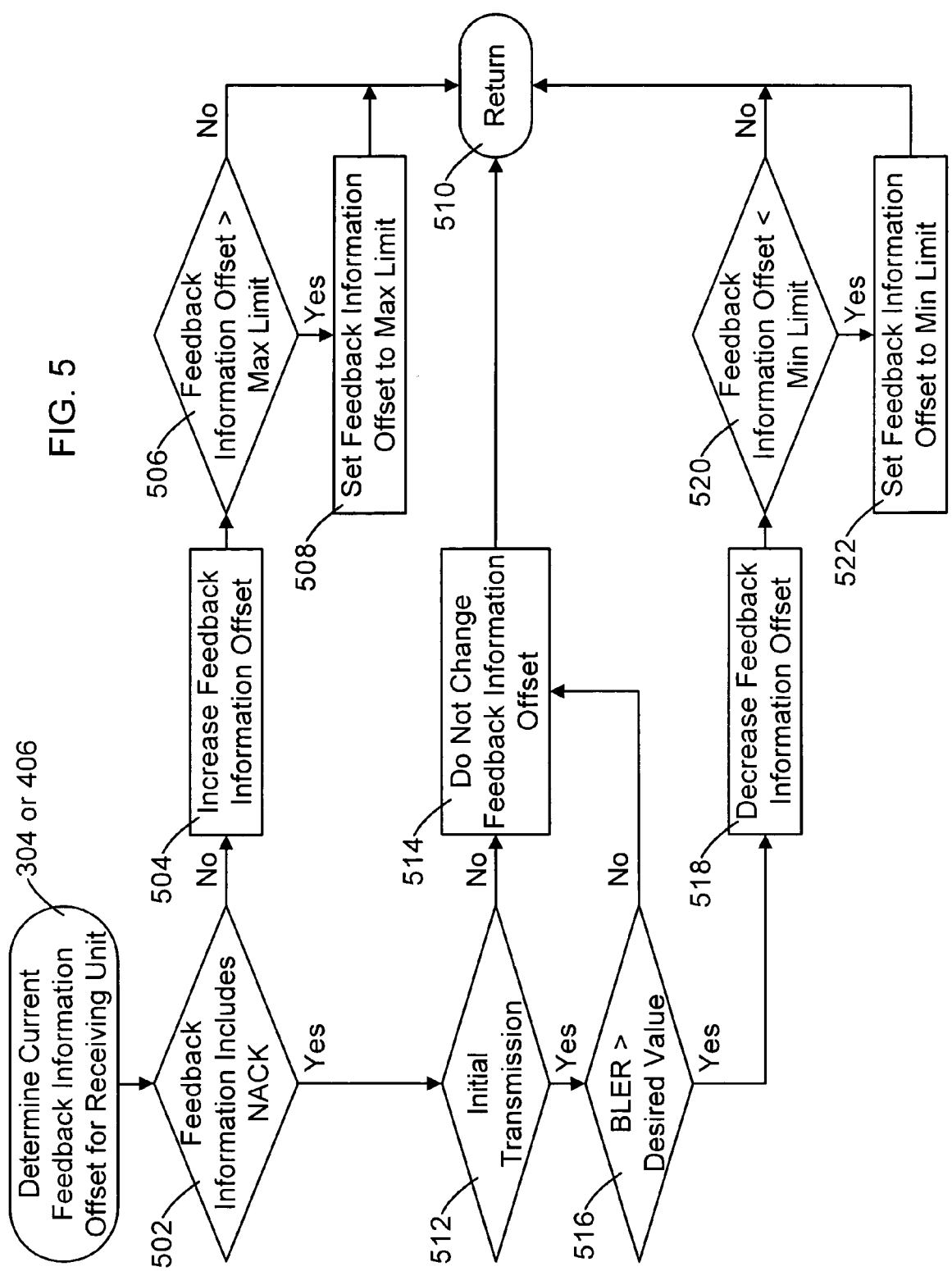
FIG. 5 is a flow chart illustrating a method to determine a current feedback information offset in accordance with one embodiment of the present invention.

Now referring to FIG. 5, a flow chart illustrating a method to determine a current feedback information offset 304 or 406 in accordance with one embodiment of the present invention is shown. If the feedback information does not include a NACK, as determined in decision block 502, the feedback information offset is increased in block 504. If the feedback information offset is higher than a maximum value or limit, as determined in decision block 506, the feedback information offset is set to the maximum limit in block 508. Thereafter or if the feedback information is not higher than the maximum value, as determined in decision block 508, processing returns to the main process in block 510 (FIG. 3 or 4). If, however, the feedback information does include a NACK, as determined in decision block 502, and this is not an initial transmission, as determined in decision block 512, the feedback information offset is not changed in block 514 and processing returns to the main process in block 510 (FIG. 3 or 4). If, however, the feedback information does include a NACK, as determined in decision block 502, this is an initial transmission, as determined in decision block 512 and the BLER is not greater than a desired value (e.g., 10%), as determined in decision block 516, the feedback information offset is not changed in block 514 and processing returns to the main process in block 510 (FIG. 3 or 4). If, however, the feedback information does include a NACK, as determined in decision block 502, this is an initial transmission, as determined in decision block 512 and the BLER is greater than a desired value (e.g., 10%), as determined in decision block 516, the feedback information offset is decreased in block 518. If the feedback information offset is lower than a minimum value or limit, as determined in decision block 520, the feedback information offset is set to the minimum limit in block 522. Thereafter or if the feedback information is not less than the minimum value, as determined in decision block 520, processing returns to the main process in block 510 (FIG. 3 or 4). Note that the feedback information offset can be increased or decreased in uniform increments, predetermined increments, scaled increments or calculated increments. The increments can depend on a fixed value, a value based on the UE 102 or receiving unit 272, a value based on a user profile associated with the UE 102 or receiving unit 272, a value based on historical data, a value derived from feedback information received from the UE 102 or receiving unit 272, a value based on one or more conditions of the wireless communications network, etc. Moreover, a previously determined feedback information offset can be used instead of the currently determined offset.

Figure 6:
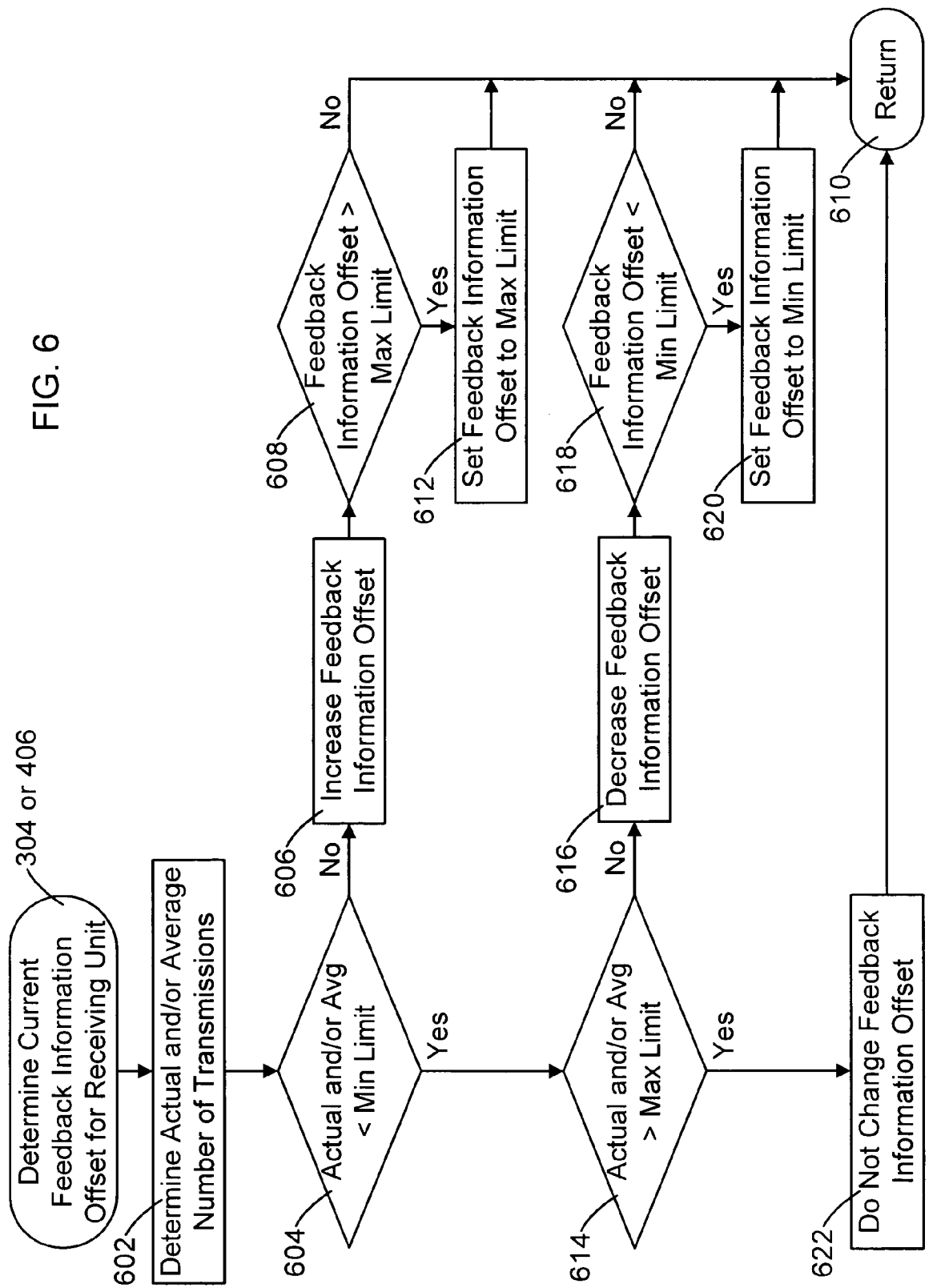
FIG. 6 is a flow chart illustrating a method to determine a current feedback information offset in accordance with another embodiment of the present invention.

Referring now to FIG. 6, a flow chart illustrating a method to determine a current feedback information offset 304 or 406 in accordance with another embodiment of the present invention is shown. The process begins by determining the actual number of transmissions or an average number of transmissions in block 602. If the actual number and/or average number of transmissions is larger than a minimum limit (e.g., a specified value or lower limit of a desired operating range), as determined in decision block 604, the feedback information offset is increased in block 606. If the feedback information offset is higher than a maximum value or limit, as determined in decision block 608, the feedback information offset is set to the maximum limit in block 612. Thereafter or if the feedback information is not higher than the maximum value, as determined in decision block 608, processing returns to the main process in block 610 (FIG. 3 or 4). If, however, the actual number and/or average number of transmissions is greater than the minimum limit, as determined in decision block 604, and the actual number and/or average number of transmissions is greater than a maximum limit (e.g., a specified value or upper limit of a desired operating range), as determined in decision block 614, the feedback information offset is decreased in block 616. If the feedback information offset is lower than a minimum value or limit, as determined in decision block 618, the feedback information offset is set to the minimum limit in block 620. Thereafter or if the feedback information is not less than the minimum value, as determined in decision block 618, processing returns to the main process in block 610 (FIG. 3 or 4). If, however, the actual number and/or average number of transmissions are between the minimum and maximum limits, as determined in decision blocks 604 and 614, the feedback information offset is not changed in block 622 and processing returns to the main process in block 610 (FIG. 3 or 4). Note that the feedback information offset can be increased or decreased in uniform increments, predetermined increments, scaled increments or calculated increments. The increments can depend on a fixed value, a value based on the UE 102 or receiving unit 272, a value based on a user profile associated with the UE 102 or receiving unit 272, a value based on historical data, a value derived from feedback information received from the UE 102 or receiving unit 272, a value based on one or more conditions of the wireless communications network, etc.

Figure 7:
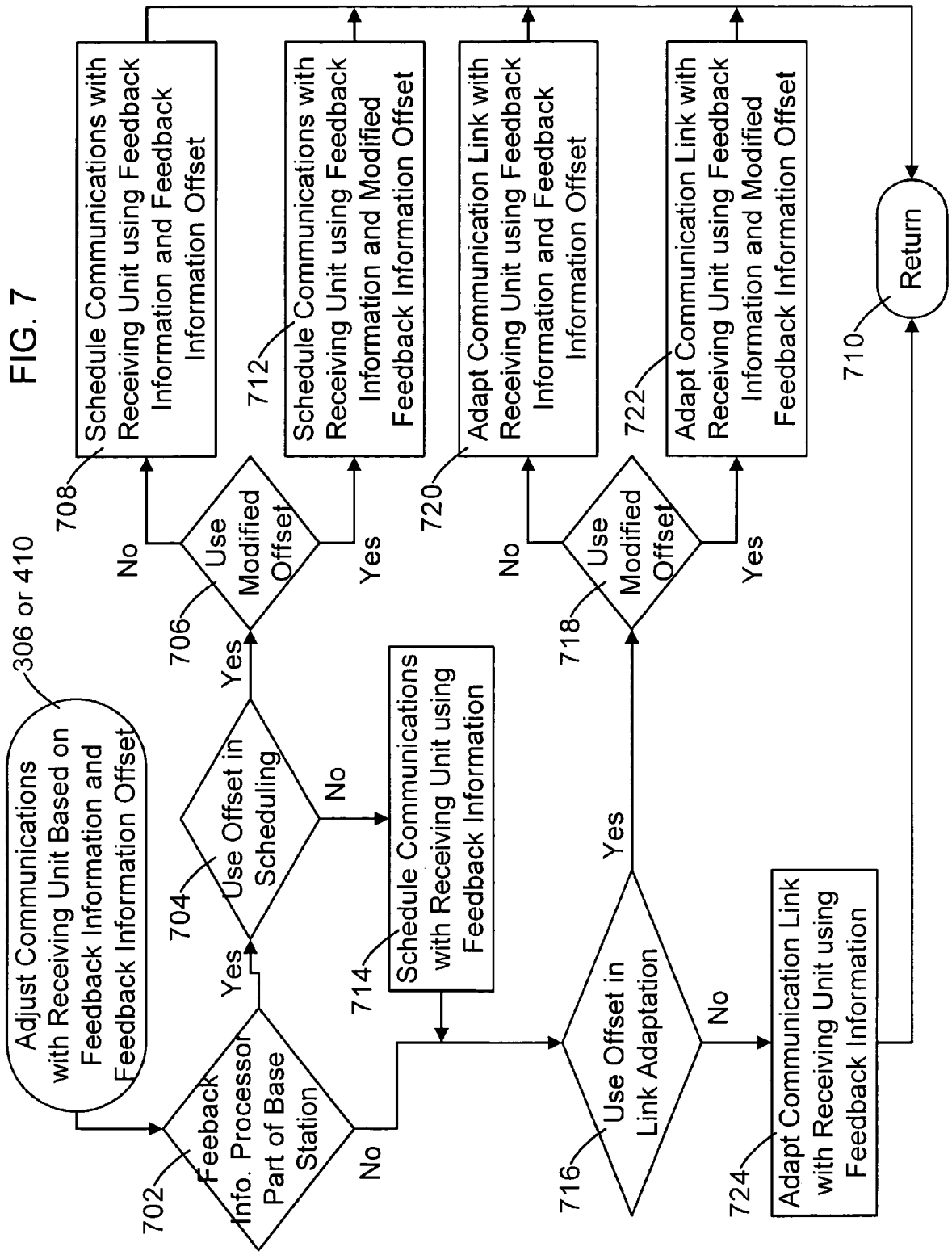
FIG. 7 is a flow chart illustrating a method to adjust communications based on feedback information and a feedback information offset in accordance with one embodiment of the present invention.

Now referring to FIG. 7, a flow chart illustrating a method to adjust communications based on feedback information and a feedback information offset 306 or 410 in accordance with one embodiment of the present invention is shown. If the feedback information processor 216 or 278 is not part of a base station 104 or other device communicating with multiple UEs 102 or receiving units 272, as determined in decision block 702, and the feedback information offset is to be used in scheduling decisions, as determined in decision block 704, and a modified offset is not to be used, as determined in decision block 706, the communications with the UE 102 or receiving unit 272 are scheduled using the feedback information and the feedback information offset in block 708 and processing returns to the main process in block 710. The modified feedback information offset is the feedback information offset after it has been modified to be properly applied to scheduling, link adaptation or other operational parameters. For example, the modified feedback information offset might have a value of zero, an absolute value of the feedback information offset or a negative of the absolute value of the feedback information offset. If, however, a modified offset is to be used, as determined in decision block 706, the communications with the UE 102 or receiving unit 272 are scheduled using the feedback information and a modified feedback information offset in block 712 and processing returns to the main process in block 710. If, however, the feedback information offset is not to be used in scheduling decisions, as determined in decision block 704, the communications with the UE 102 or receiving unit 272 are scheduled using the feedback information only in block 714. Thereafter or if the feedback information processor 216 or 278 is not part of a base station 104 or other device communicating with multiple UEs 102 or receiving units 272, as determined in decision block 702, if the feedback information offset is to be used in link adaptation, as determined in decision block 716, and a modified offset is not to be used, as determined in decision block 718, the communication link with the UE 102 or receiving unit 272 is adapted using the feedback information and the feedback information offset in block 720 and processing returns to the main process in block 710. If, however, a modified offset is to be used, as determined in decision block 718, the communication link with the UE 102 or receiving unit 272 is adapted using the feedback information and a modified feedback information offset in block 722 and processing returns to the main process in block 710. If, however, the feedback information offset is not to be used in link adaptation, as determined in decision block 716, the communication link with the UE 102 or receiving unit 272 is adapted using the feedback information in block 724 and processing returns to the main process in block 710. Note that the processes to use the feedback information offset in scheduling and link adaptation can be separated from one another and determined in serial or parallel.

Referring to FIG. 8, a flow chart illustrating a method to adjust communications based on feedback information and a feedback information offset 416 in accordance with another embodiment of the present invention is shown. If the feedback information offset is to be used in scheduling decisions, as determined in decision block 802, and a modified offset is not to be used, as determined in decision block 804, the communications with the UE 102 or receiving unit 272 are scheduled using the feedback information and the feedback information offset in block 806 and processing returns to the main process in block 808. The modified feedback information offset is the feedback information offset after it has been modified to be properly applied to scheduling, link adaptation or other operational parameters. For example, the modified feedback information offset might have a value of zero, an absolute value of the feedback information offset or a negative of the absolute value of the feedback information offset. If, however, a modified offset is to be used, as determined in decision block 804, the communications with the UE 102 or receiving unit 272 are scheduled using the feedback information and a modified feedback information offset in block 810 and processing returns to the main process in block 808. If, however, the feedback information offset is not to be used in scheduling decisions, as determined in decision block 802, the communications with the UE 102 or receiving unit 272 are scheduled using the feedback information only in block 812. The load-based feedback information may also be used. Thereafter, if the feedback information offset is to be used in link adaptation, as determined in decision block 814, and a modified offset is not to be used, as determined in decision block 816, the communication link with the UE 102 or receiving unit 272 is adapted using the feedback information, the feedback information offset and the load-based feedback information offset in block 818 and processing returns to the main process in block 808. If, however, a modified offset is to be used, as determined in decision block 816, the communication link with the UE 102 or receiving unit 272 is adapted using the feedback information, a modified feedback information offset and the load-based feedback information offset in block 820 and processing returns to the main process in block 808. If, however, the feedback information offset is not to be used in link adaptation, as determined in decision block 814, the communication link with the UE 102 or receiving unit 272 is adapted using the feedback information in block 822 and processing returns to the main process in block 808. Note that the processes to use the feedback information offset in scheduling and link adaptation can be separated from one another and determined in serial or parallel.

All of the previously described methods or processes can be implemented by a computer program embodied on a computer readable medium wherein the various process steps are executed by one or more code segments.

Now referring to FIG. 9A, a flow chart illustrating a method to adjust communications 900 at a base station 104 in a WCDMA network in accordance with one embodiment of the present invention is shown. The base station 104 sends a message to the UE 102 on the HS-SCCH channel (shared control channel for the high speed downlink shared channel) in block 902 and a message on the HS-DSCH channel (high speed downlink shared channel) in block 904. The base station 104 receives a message from the UE 102 on the HS-DPCCH channel in block 906. The base station 104 then processes the CQI information and adjusts communications with the UE 102 in block 908. This CQI processing includes the determination of a feedback information offset and the methods previously described. Likewise, the communication adjustments may include scheduling and link adaptation changes. The UE 102 is then selected as an active data recipient in accordance with the base station scheduler in block 910. This process repeats for all communications with the UE 102.

Referring now to FIG. 9B, a flow chart illustrating a method of reporting feedback information 930 at the user equipment 102 in a WCDMA network in accordance with one embodiment of the present invention is shown. The UE 102 listens for a message addressed to the UE 102 on the HS-SCCH channel in block 932. If the UE 102 is not designated to receive the message on the HS-DSCH channel, as determined in decision block 934, the UE 102 transmits a DTX and CQI on the HS-DPCCH to the base station 104 in block 936 and continues to listen to the HS-SCCH channel in block 932. If, however, the UE is designated to receive the message on the HS-DSCH channel, as determined in decision block 934, the message is received in block 938. If the message on the HS-DSCH channel was not successfully received, as determined in decision block 940, the UE 102 sends a NACK message and CQI on the HS-DPCCH channel to the base station 104 in block 942 and continues to listen to the HS-SCCH channel in block 932. As previously described, the CQI is feedback information calculated by the UE 102 to estimate current radio conditions. If the message on the HS-DSCH channel was successfully received, as determined in decision block 940, the UE 102 processes the HS-DSCH message in block 944 and sends a ACK message and CQI on the HS-DPCCH channel to the base station 104 in block 946 and continues to listen to the HS-SCCH channel in block 932.

Figure 9C:
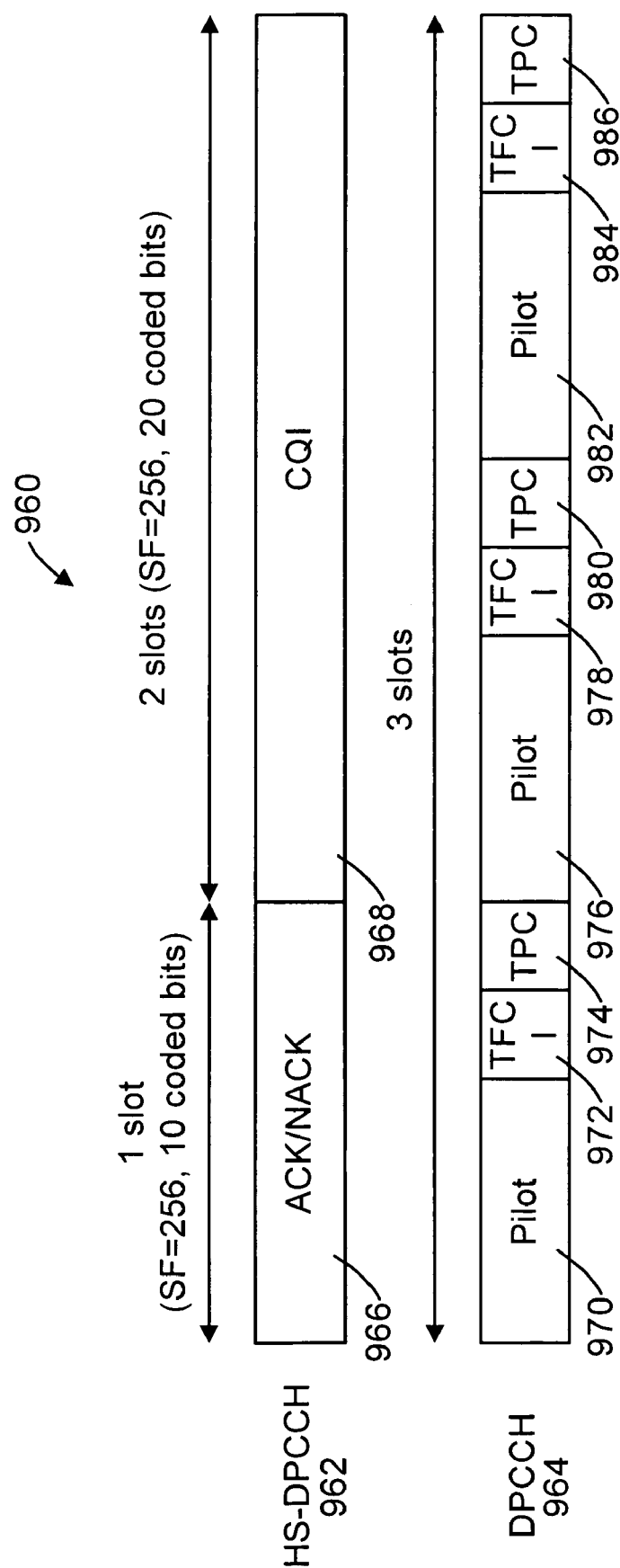
FIG. 9C is a message format for reporting feedback information in accordance with one embodiment of the present invention.

Now referring to FIG. 9C, a message format 960 for reporting feedback information in a WCDMA network in accordance with one embodiment of the present invention is shown. The messages sent on the HS-DPCCH channel 962 contain an ACK or NACK 966 and CQI 968. The ACK/NACK 966 is one slot for SF=256, 10 coded bits. The CQI 968 is two slots for SF=256, 20 coded bits. The messages sent on the DPCCH channel 964 are three slots and contain a pilot 970, 976 and 982, a transport format combination indicator ("TFCI") 972, 978 and 984, and a transport power control ("TPC") 974, 980 and 986.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A method of adjusting one or more communications with a receiving unit in a wireless communication network, the method comprising the steps of:
   receiving feedback information relating to the receiving unit, the feedback information relating to radio conditions between the wireless communication network and the receiving unit;
   determining a feedback information offset for the receiving unit by a feedback information processor located separately from the receiving unit, wherein the step of determining the feedback information offset comprises the further steps of:
      increasing the feedback information offset whenever the feedback information includes a negative acknowledgement ("NACK"); and
      decreasing the feedback information offset whenever the feedback information includes an acknowledgement ("ACK"), wherein the step of decreasing the feedback information offset comprises the further steps of:
         leaving the feedback information offset unchanged whenever the feedback information includes an acknowledgement ("ACK") and the feedback information is not related to an initial transmission;
         leaving the feedback information offset unchanged whenever the feedback information includes an acknowledgment ("ACK"), the feedback information is related to an initial transmission and a BLER is not greater than a desired value; and
         decreasing the feedback information offset whenever the feedback information includes and acknowledgement ("ACK") and the BLER is greater than the desired values; and
   adjusting the one or more communications providing a downlink with the receiving unit based on the feedback information and the feedback information offset.

2. A method of adjusting one or more communications with a receiving unit in a wireless communication network, the method comprising the steps of:
   receiving feedback information relating to the receiving unit, the feedback information relating to radio conditions between the wireless communication network and the receiving unit;
   determining a feedback information offset for the receiving unit by a feedback information processor located separately from the receiving unit;
   adjusting the one or more communications providing a downlink with the receiving unit based on the feedback information and the feedback information offset, wherein the step of adjusting one or more communications comprises the further steps of:
      determining whether adjust the scheduling of the one or more communications with the receiving unit using the feedback information offset;
      scheduling the one or more communications with the receiving unit using the feedback information and the feedback information offset whenever the scheduling of the one or more communications with the receiving unit is to be adjusted using the feedback information offset;
      scheduling the one or more communications with the receiving unit using the feedback information whenever the scheduling of the one or more communications with the receiving unit is not to be adjusted using the feedback information offset;
      determining whether to adapt one or more communication links with the receiving unit using the feedback information offset;
      adapting one or more communication links with the receiving unit using the feedback information and the feedback information offset whenever the one or more communication links with the receiving unit are to be adapted using the feedback information offset; and
      adapting one or more communication links with the receiving unit using the feedback information whenever the one or more communication links with the receiving unit are not to be adapted using the feedback information offset.

3. A method of adjusting one or more communications with a receiving unit in a wireless communication network, the method comprising the steps of:
   receiving feedback information relating to the receiving unit, the feedback information relating to radio conditions between the wireless communication network and the receiving unit;
   determining a feedback information offset for the receiving unit by a feedback information processor located separately from the receiving unit;
   adjusting the one or more communications providing a downlink with the receiving unit based on the feedback information and the feedback information offset; wherein the step of adjusting one or more communications comprises the further steps of:
      determining whether to use the feedback information offset or a previous feedback information offset;
      adjusting the one or more communications with the receiving unit based on the feedback information whenever the feedback information offset is not to be used;
      adjusting the one or more communications with the receiving unit based on the feedback information and the feedback information offset whenever the feedback information offset is to be used; and
      adjusting the one or more communications with the receiving unit based on the feedback information and the previous feedback information offset whenever the previous feedback information offset is to be used.

4. The method as recited in claim 3, wherein a modified feedback information offset is used instead of the feedback information offset.

5. The method as recited in claim 4, wherein the modified feedback information offset has a value of zero, an absolute value of the feedback information offset or a negative of the absolute value of the feedback information offset.

6. A computer program embodied on a computer readable medium for adjusting one or more communications with a receiving unit in a wireless communication network, the computer program comprising:
   a code segment adapted to receive feedback information relating to the receiving unit, the feedback information relating to radio conditions between the wireless communication network and the receiving unit;
   a code segment adapted to determine a feedback information offset for the receiving unit by a feedback information processor located separately from the receiving unit, wherein the code segment adapted to determinine the feedback information offset further comprises:

a code segment adapted to increase the feedback information offset whenever the feedback information includes a negative acknowledgement ("NACK"); and a code segment adapted to decrease the feedback information offset whenever the feedback information includes an acknowledgement ("ACK"), wherein the code segment adapted to decrease the feedback information offset further comprises:

a code segment adapted to leave the feedback information offset unchanged whenever the feedback information includes an acknowledgement ("ACK") and the feedback information is not related to an initial transmission;

a code segment adapted to leave the feedback information offset unchanged whenever the feedback information includes an acknowledgment ("ACK"), the feedback information is related to an initial transmission and a BLER is not greater than a desired value; and a code segment adapted to decrease the feedback information offset whenever the feedback information includes and acknowledgement ("ACK") and the BLER is greater than the desired value; and a code segment adapted to adjust the one or more communications providing a downlink with the receiving unit based on the feedback information and the feedback information offset.

7. An apparatus for adjusting one or more communications with a receiving unit in a wireless communication network comprising:

a means to receive feedback information relating to the receiving unit, the feedback information relating to radio conditions between the wireless communication network and the receiving unit;

a means to determine a feedback information offset for the receiving unit by a feedback information processor located separately from the receiving unit, wherein the means to determine the feedback information offset further comprises:

a means for increasing the feedback information offset whenever the feedback information includes a negative acknowledgement ("NACK"); and a means for decreasing the feedback information offset whenever the feedback information includes an acknowledgement ("ACK"), wherein the step of decreasing the feedback information offset further comprises:

a means for leaving the feedback information offset unchanged whenever the feedback information includes an acknowledgement ("ACK") and the feedback information is not related to an initial transmission;

a means for leaving the feedback information offset unchanged whenever the feedback information includes an acknowledgment ("ACK"), the feedback information is related to an initial transmission and a BLER is not greater than a desired value; and a means for decreasing the feedback information offset whenever the feedback information includes and acknowledgement ("ACK") and the BLER is greater than the desired value; and a means for adjusting the one or more communications providing a downlink with the receiving unit based on the feedback information and the feedback information offset.

* * * * *

UNITED STATES PATENT AND TRADEMARK OFFICE
CERTIFICATE OF CORRECTION

PATENT NO. : 7,310,499 B2  Page 1 of 1
APPLICATION NO. : 10/780206
DATED : December 18, 2007
INVENTOR(S) : Magnusson et al.

It is certified that error appears in the above-identified patent and that said Letters Patent is hereby corrected as shown below:

On the Title Page, in item (73), under "Assignee", in Column 1, Line 1, delete "Telefonktiebolaget" and insert -- Telefonaktiebolaget --, therefor.

In Column 5, Line 28, delete "XDSL" and insert -- xDSL --, therefor.

In Column 15, Line 35, in Claim 1, after "includes" delete "and" and insert -- an --, therefor.

In Column 15, Line 37, in Claim 1, delete "values" and insert -- value --, therefor.

In Column 16, Line 66, in Claim 6, delete "determinine" and insert -- determine --, therefor.

In Column 17, Line 23, in Claim 6, after "includes" delete "and" and insert -- an --, therefor.

In Column 18, Line 28, in Claim 7, before "acknowledgement" delete "and" and insert -- an --, therefor.

Signed and Sealed this

Sixteenth Day of September, 2008

JON W. DUDAS
*Director of the United States Patent and Trademark Office*